United States Patent [19]

Roche

[11] Patent Number: 4,566,494

[45] Date of Patent: Jan. 28, 1986

[54] VENT LINE SYSTEM

[75] Inventor: Joseph R. Roche, Humble, Tex.

[73] Assignee: Hydril Company, Los Angeles, Calif.

[21] Appl. No.: 707,521

[22] Filed: Mar. 1, 1985

Related U.S. Application Data

[63] Continuation of Ser. No. 458,206, Jan. 17, 1983, abandoned.

[51] Int. Cl.[4] ............................................ E21B 33/035
[52] U.S. Cl. ................................ 137/872; 137/625.46;
   137/876; 137/887; 166/84; 166/363; 251/1.2
[58] Field of Search ................... 137/625.46, 869, 872,
   137/875, 876, 887; 166/84, 87, 88, 363; 251/1
   R, 1 A, 1 B

[56] References Cited

U.S. PATENT DOCUMENTS

| | | | |
|---|---|---|---|
| 2,021,104 | 11/1935 | Kinnear . | |
| 3,599,711 | 8/1971 | Fowler | 137/875 X |
| 3,636,980 | 1/1972 | Maloney | 137/875 X |
| 3,805,833 | 4/1974 | Teed . | |
| 3,856,037 | 12/1974 | Garrett et al. . | |
| 3,917,008 | 11/1975 | Suter . | |
| 3,956,073 | 5/1976 | Carbone et al. | 137/625.46 X |
| 4,046,191 | 9/1977 | Neath . | |
| 4,063,602 | 12/1977 | Howell et al. . | |
| 4,190,082 | 2/1980 | Hernandez Crespo | 137/872 X |
| 4,378,849 | 4/1983 | Wilks | 251/1 R X |
| 4,388,766 | 6/1983 | Sanderson | 137/875 X |
| 4,444,250 | 4/1984 | Keithahn et al. | 166/84 |
| 4,444,401 | 4/1984 | Roche et al. | 166/84 X |
| 4,456,062 | 6/1984 | Roche et al. | 251/1 A X |

FOREIGN PATENT DOCUMENTS

| | | | |
|---|---|---|---|
| 237307 | 2/1962 | Austria | 137/625.46 |
| 1062074 | 7/1959 | Fed. Rep. of Germany | 137/625.46 |
| 598844 | 10/1959 | Italy | 137/625.46 |
| 107171 | 8/1980 | Japan | 137/625.46 |

OTHER PUBLICATIONS

*Blowout Prevention*, Second Edition, vol. 1, pp. 115-119, Aug. 1983.

*Primary Examiner*—Gerald A. Michalsky
*Attorney, Agent, or Firm*—Dodge, Bush & Moseley

[57] ABSTRACT

A vent line system is disclosed which is adapted for connection to a flow diverter attached to a drilling rig. The system assures that the vent line is always open for discharge of pressurized drilling fluid away from the drilling rig in one of two directions.

8 Claims, 8 Drawing Figures

FIG. 5
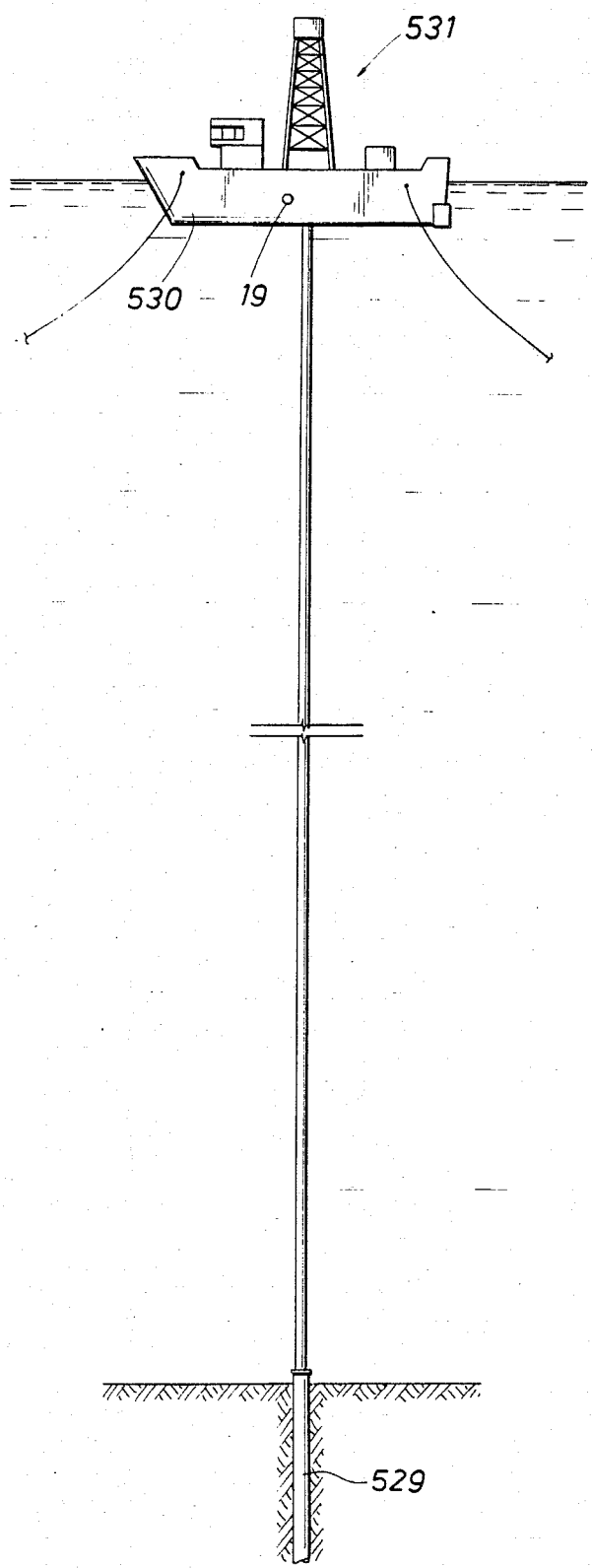
FIG. 6
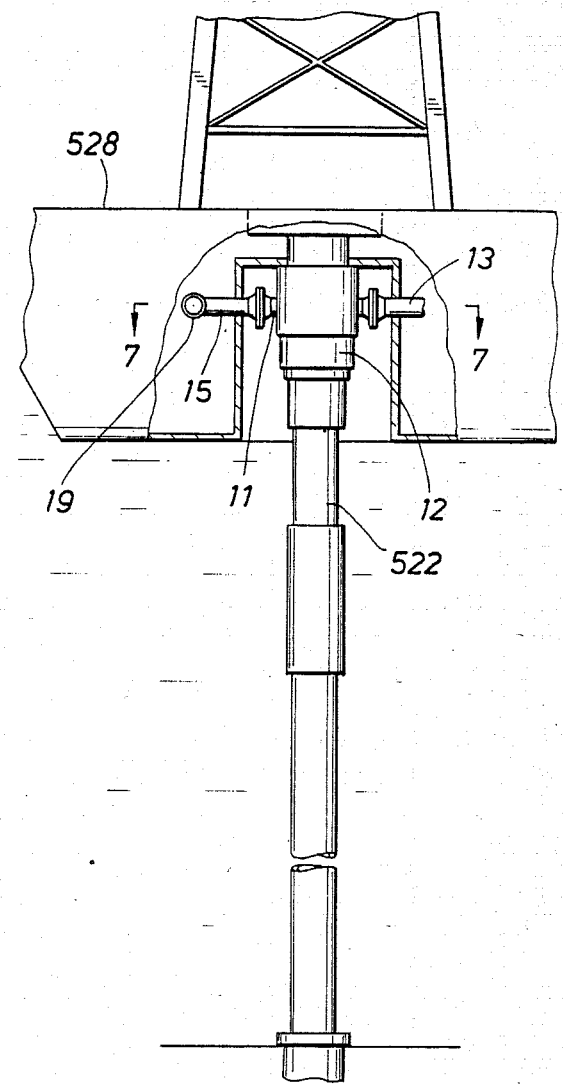
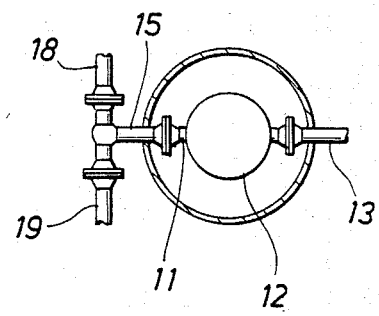
FIG. 7

VENT LINE SYSTEM

This is a continuation of application Ser. No. 458,206 filed Jan. 17, 1983, now abandoned.

BACKGROUND OF THE INVENTION

1. Field of the Invention

The invention disclosed herein relates to a diverter apparatus and system for redirecting the flow of drilling fluid or mud and cuttings that would otherwise be blown upward to the rig floor during a "kick" encountered during initial hole drilling. In general, the apparatus and system according to the invention may be used beneath the drilling floor of any land or marine drilling rig, but in particular the invention finds application with floating drilling equipment. More particularly, the invention relates to a vent line system for connecting to a diverter in which the system has a blast deflecting means to deflect the mud and cuttings flowing in the vent line overboard assuring that no means are provided to prevent such flow.

2. Description of the Prior Art

When drilling an oil or gas well from a floating vessel, an initial large diameter bore hole is established to shallow depths. Protective conduit typically thirty (30) inches in diameter, is secured in the shallow bore through which the drilling takes place. Then a subsea riser is put in place extending from the sea floor to the drilling rig platform.

Flow diverters are typically provided below the rig floor and between the riser and the rotary table of the drilling rig for the purpose of safety venting unbalanced well bore pressure which may produce an upward flow of well flow fluid in the riser having sufficient impetus to issue from the top of the riser, thereby contributing a hazard to personnel and equipment. Such an occurrence, called a "kick" results when the formation fluid pressure exceeds the head in the riser and borehole and is sometimes encountered in conductor hole drilling, making a flow diverter essential before blowout preventers are connected to the drilling system. A flow diverter is considered necessary for safe operation on a floating offshore drilling rig where blowout preventers are placed on the sea floor only after the casing has been set to a considerable depth below the sea floor.

Flow diverter systems which have been provided in the past have faced significant safety problems because the available equipment has required that valves external to the diverter be placed in the vent line system. Such valves have been necessary because the vent line was in general open to the annulus of the drilling conduit below the diverter element adapted for closing the vertical flow path of the bore. The vent line valve was opened simultaneously with or prior to the closing of the diverter element. Typically a "T" joint has been provided to direct flow in the vent line to one of two discharge lines, one leading to the port side of the vessel, the other to the starboard. Valves in each of the discharge lines enabled rig personnel to close one of the discharge lines so that vent line flow could be discharged to the leeward side of the vessel.

In the past, such external valves have sometimes been locked closed by rig personnel while testing the flow diverter system, but after the diverter had been made operational during drilling, the external valves have been unintentionally left locked closed. On other occasions, control system elements for remotely operating the external valves have been inadvertently incorrectly connected, resulting in simultaneous closure of all of the external diverter system valves and the diverter itself. If such flow diverters have closed about the annulus of a drill pipe or other object in the well bore, such flow diverter systems have created an extremely dangerous situation, and in fact, in some cases they have exploded with the result of loss of life and property. The complexity of the circuitry that sequences the operation of the valves and the diverter invites mistakes in connection even by skilled technicians.

It is an object of the invention described below, to provide a vent line system which, when used in combination with a novel flow diverter which requires no external vent line valves, is failsafe; that is, when a kick occurs during shallow hole drilling of a well before a blowout preventer has been provided, that kick cannot be accidently confined by the vent line system to build pressure and explode, even if controls are misconnected or malfunctioning.

It is a further object of the invention to provide a blast deflecting system that always has an open vent path.

It is a still further object of the invention to provide a blast deflecting device which requires but a single motion to operate, is simple and relatively inexpensive to manufacture.

SUMMARY OF THE INVENTION

According to the invention a vent line system adapted for use with a flow diverter system includes a vent line adapted for connection to the flow diverter. A deflecting means is provided in the vent line having an inlet port and two outlet ports. The outlet ports are connected to first and second deflect lines which are preferably directed to opposite extremities (i.e., port and starboard or fore and aft) of the drilling rig vessel for discharging the well flow fluid and cutting during the occurrence of a "kick" while drilling.

The deflecting unit includes a blast deflector element between the two outlet ports for deflecting the flow to one port or the other, yet insuring that one or the other of the ports at all times remains open. According to the invention three embodiments of the deflecting unit are described. The first includes a deflecting element which may be angularly rotated in the body of the deflecting unit to direct the flow to one or the other of the outlet ports. According to the second embodiment, a deflecting element is adapted to move in a linear direction between two positions intermediate the inlet and outlet ports and accomplishes the same function as the first embodiment. A third embodiment of the deflecting unit is a rotary sleeve blast deflector/selector in which the axis of the sleeve is parallel to the inlet flow and a removable target is provided for impingement of abrasive well flow.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which:

FIG. 5 illustrates a drilling vessel positioned for drilling a well according to the invention;

FIG. 6 illustrates a flow diverter according to the invention under the drilling rig floor; and FIG. 7 is a section view on lines 7—7 in FIG. 6.

DESCRIPTION OF THE INVENTION

Figure 1:
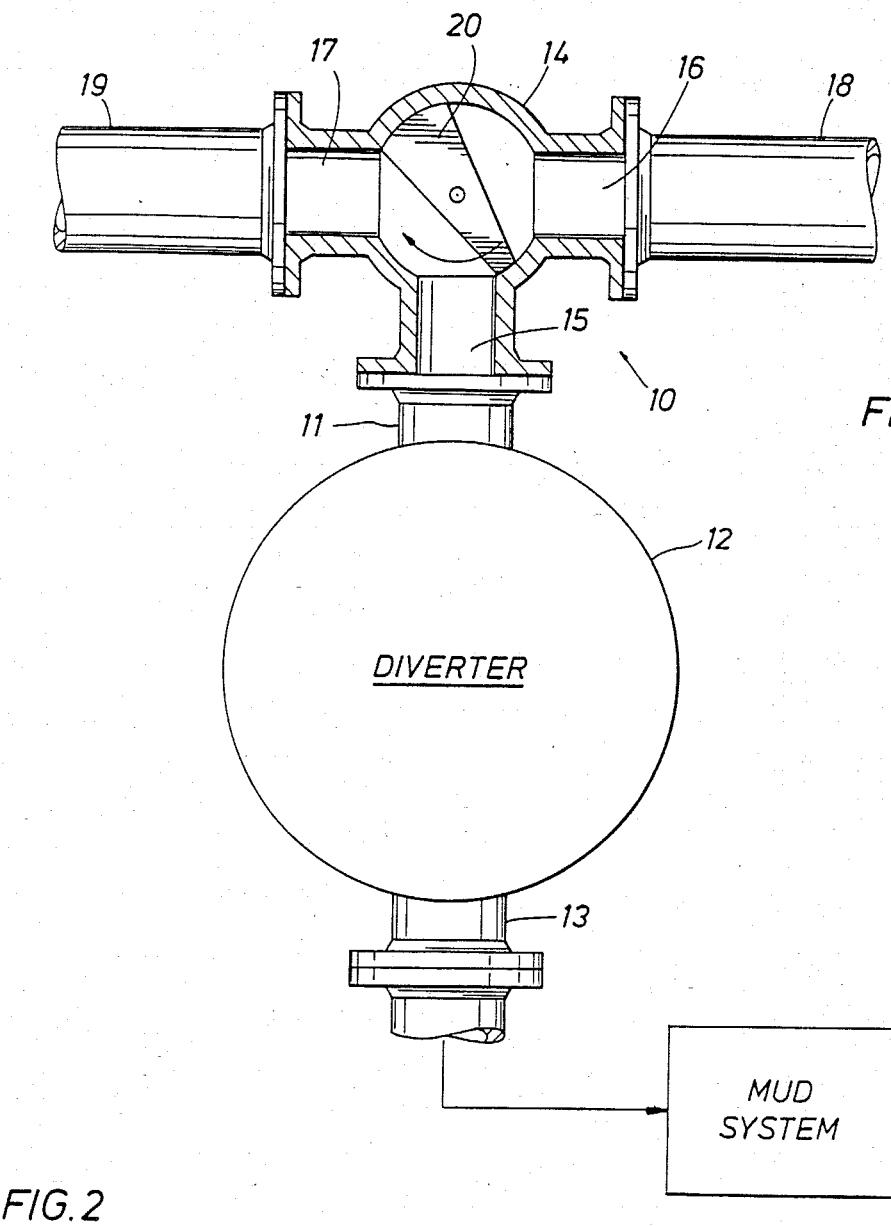
FIG. 1 illustrates the vent line system according to the invention attached to a diverter.

FIG. 1 illustrates the vent line system shown generally at 10 in which a vent line 11 is connected to a flow diverter 12. As will be described below, diverter 12 is preferably connected below a drilling rig floor 528 above a driling conduit 522 (FIG. 4) and is provided with means for connecting the vent line 11 for directing drilling rig mud and cuttings away from the rig floor on the occasion of a kick while drilling a well 529 (FIG. 5). Attached to the diverter also is a flow line means 13 which is connected to the drilling rig mud system.

The deflecting unit 14 of the system 10 is a "T" shaped connecting element having an inlet port 15 and outlet ports 16 and 17. Outlet ports 16 and 17 are connected to deflect lines 18 and 19 for directing the flow from the diverter 12 in two directions. Typically one of the deflect lines (in this case, line 19) is directed to the port side 530 of the vessel 531, the other deflect line (in this case, line 18) is directed to the starboard side. A blast deflector element 20 disposed within the body of the deflecting unit 14 is adapted to be placed in two positions. As illustrated in FIG. 1 the deflector element 20 is disposed in a cylindrical or alternatively a spherically shaped body and is adapted to be placed in one of two directions for deflecting the flow from inlet port 15 to one or the other of the deflecting lines 18 or 19.

Figure 2:
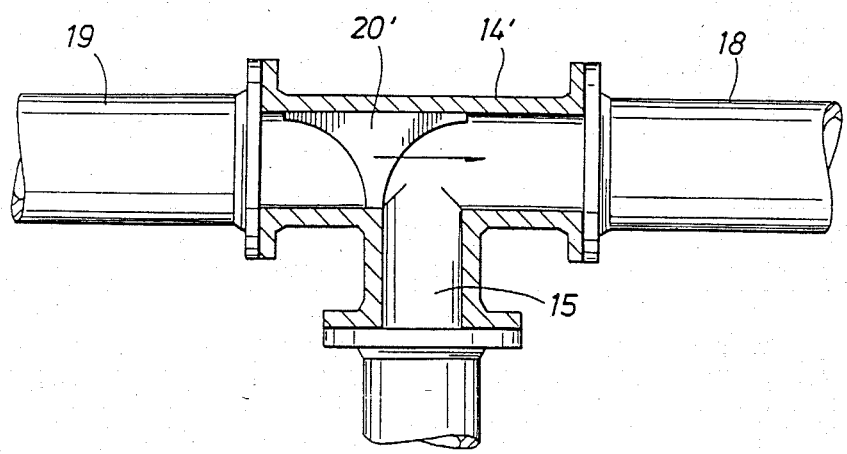
FIG. 2 shows an alternative embodiment of the blast deflector.

FIG. 2 shows an alternative embodiment of the deflecting unit 14' in which a blast deflector element 20' is adapted to move linearly along the body 14' to opposite positions whereby flow from the inlet port 15 is deflected to deflect lines 18 or 19.

Figure 3A:
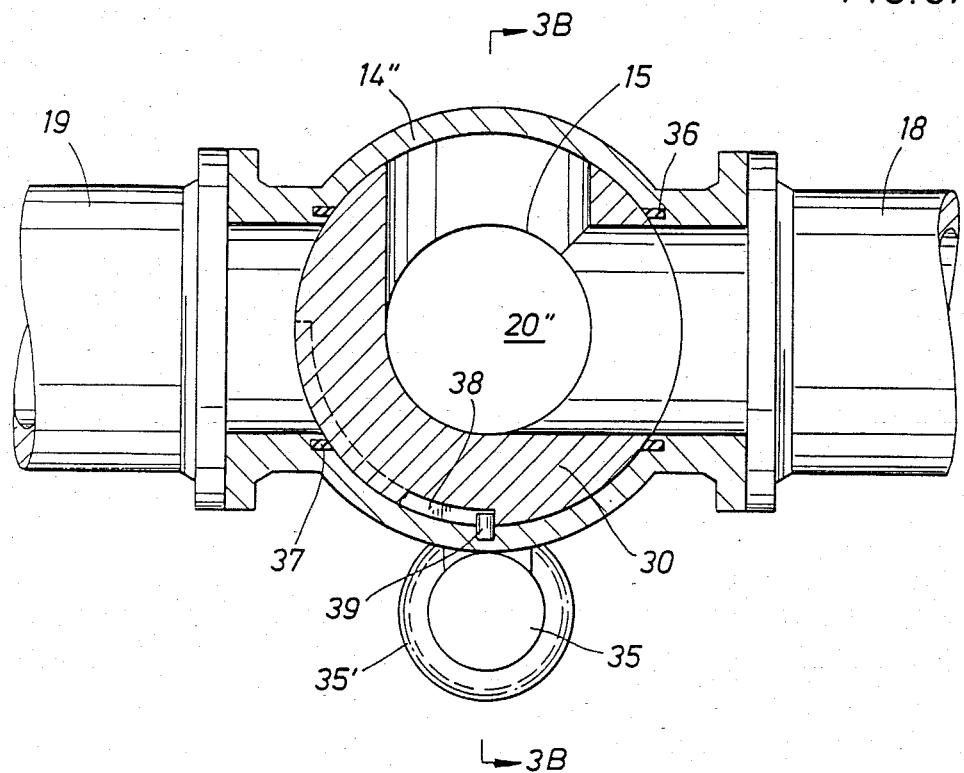
FIGS. 3A and 3B illustrate another alternative embodiment of the blast deflector.
Figure 3B:
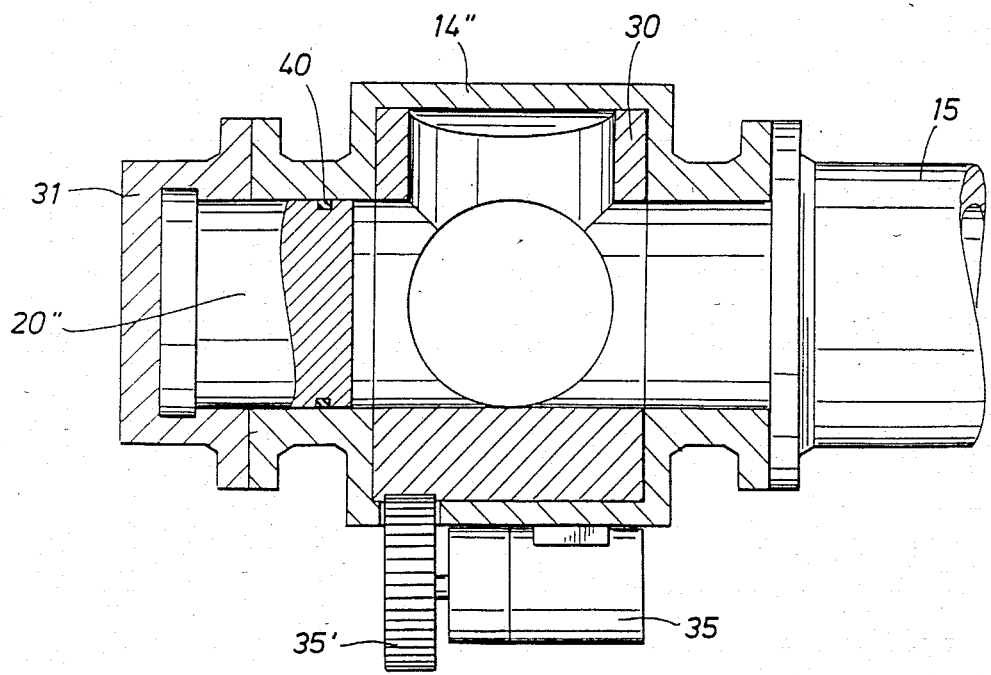

FIGS. 3A and 3B illustrate another alternative embodiment of the deflecting unit 14" in which the axis of the deflecting element, in this embodiment a rotary sleeve 30, is provided parallel to the inlet port 15. A target 20", preferably one that may be easily replaced by opening target housing 31, provides a sacrificial erosive surface for impingement of abrasive solids in the well flow entering inlet port 15. As illustrated in FIG. 3A, the rotary sleeve 30 is in position to direct flow from inlet port 15 to outlet port 18. After rotary sleeve is rotated counterclockwise by ninety degrees, inlet port 15 is opened to outlet port 19. An actuator 35 is provided to rotate sleeve 30.

As illustrated in FIG. 3B, the rotary actuator may be a motor 35 and gear 35' arrangement coupled to sleeve 30, but may be any motive and coupling means commonly employed in oilfield applications for actuating valve elements. Seals 36, 37 are provided in body 14" for sealing against rotary sleeve 30. A seal 40 is provided to seal target 20" against the body 14". A slot 38 in sleeve 30 and a stop 39 insures that sleeve 30 may travel only between the position shown in FIGS. 3A and one which is ninety degrees counterclockwise from that illustrated.

In all of the embodiments of the invention, the deflector element 20, 20' or 20" is constructed from a material suited to be highly resistant to erosion from abrasive fluid flow. Such material may be carbide coated steel, steel with a tungsten coating, steel having a ceramic coating on the blast surface, or any suitable material.

As illustrated in FIGS. 1, 2 and 3, the deflector element and vent line system according to the invention provide a simple device which requires but a single motion to operate between one of two states, yet the vent line system is always open to the diverter thereby assuring that the vent line system itself is prohibited from being closed and thereby insuring that pressurized gas from the drilling conduit to which the diverter 12 is connected is diverted away from the drilling vessel. Even if the deflecting element 20 is unintentionally left in a position causing the vent line fluid and mud to be directed to the windward side of the vessel, all that is required to direct the flow to the leeward side is to change the position of the deflecting unit 20 or 20' or 20".

The diverter 12 is preferably of the type requiring no external valves in the vent line 15. Such a diverter 12 is the subject of U.S. Pat. No. 4,456,063, issued June 26, 1984, filed in the name of the inventor of the instant application and assigned to a common assignee. Such a diverter is presented by way of example in FIG. 4.

Figure 4:
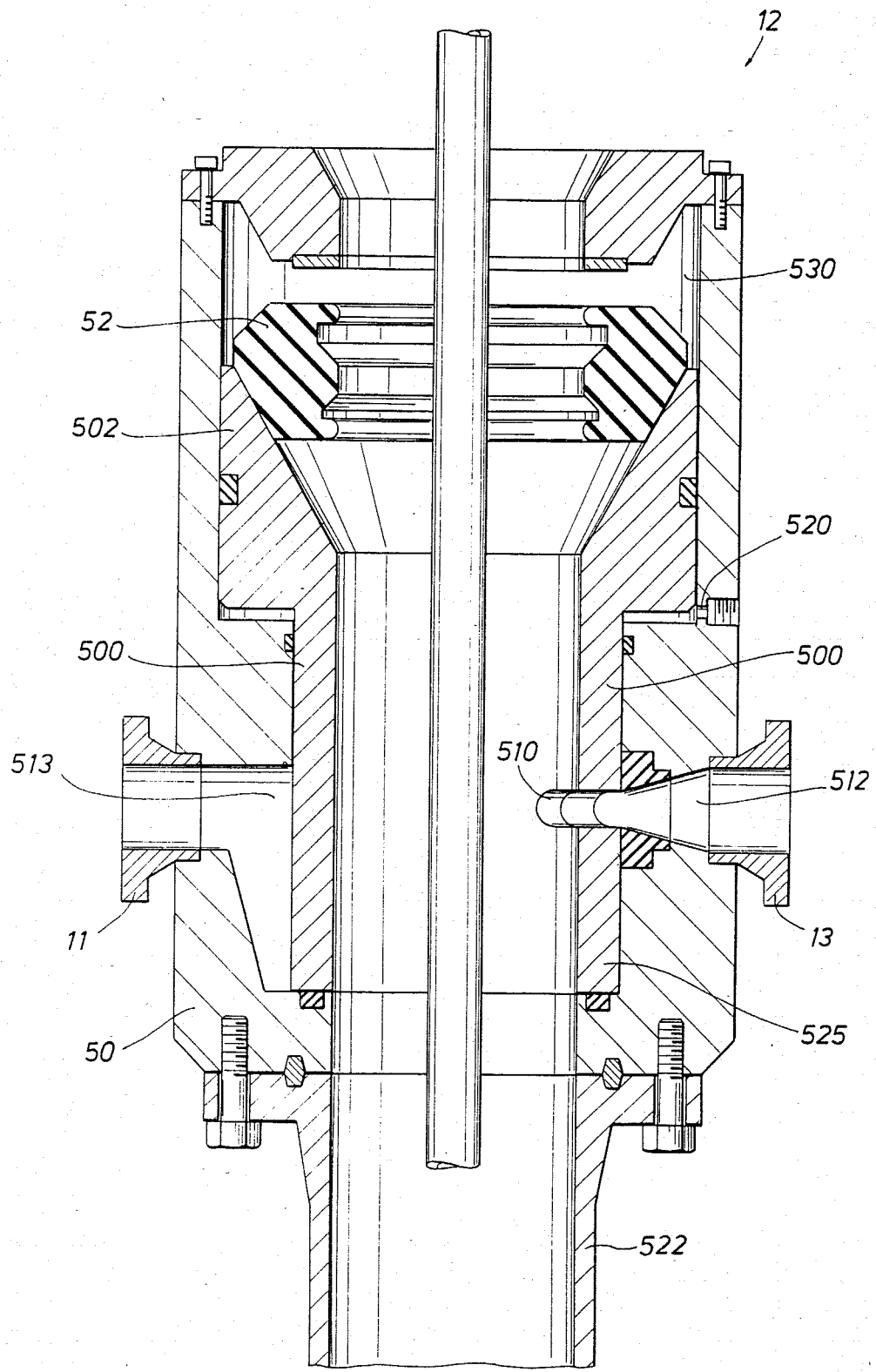
FIG. 4 illustrates a flow diverter requiring no external valves to open the bore annulus to the vent line system.

FIG. 4 illustrates an embodiment of the flow diverter 12 in which a piston 500 is provided not only for closing the annular packing element 52 about an object in the bore of the diverter, but also for closing a flow line 13 and opening a vent line 11 during an emergency. The piston 500 has an upper conical bowl portion 502 adapted for engagement with a packing element 52 and forcing it radially inward as the piston 500 moves axially upward. A hole 510 in the piston wall is normally in alignment with a hole 512 in the body 50 of the diverter 12. The second hole 513 in the body wall, provided in alignment with the vent line 11, is covered by the piston 500 wall when the diverter is in its normal state. When a source of high pressure hydraulic fluid is provided beneath the piston 500 via conduit 520, piston 500 is forced upward thereby opening vent line 11 via hole 513 providing fluid communication with the bore of the diverter 12. As piston 500 moves up, hole 512 in the body wall becomes covered by the lower part 525 of piston 500, and ultimately, hole 512 becomes completely covered by the lower part 525 of the piston.

Means are provided for insuring that the packing element 52 does not close about a pipe or other object in the bore hole before hole 512 is covered and hole 513 is opened by providing a space 530 above the packing element through which the packing elementis free to move axially upward without being forced radially inward as the upper conical portion 502 of the piston 500 moves up. Thus, a conical portion 502 of the piston 500 moves up. Thus, a means is provided by which the vent line 11 is opened and the flow line means 13 is closed from fluid communication with the bore of the flow diverter 12 before the annular packing element 52 is enabled to fully close about a pipe or other object in the bore hole or to completely close the vertical flow path of the diverter 22 in the absence of an object in the bore.

There has been provided a vent line system for use with a flow diverter in which no valves external to the diverter are provided, asuring that inadvertent errors in operation or inoperativeness of valves external to the diverter do not create the opportunity for closing flow exits from the diverter after the annulus is closed.

Various modifications and alterations in the described structures will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. A diverting system for directing drilling fluid away from a drilling rig in the event of a kick while drilling a well, the system comprising,
    a drilling conduit through which the drilling fluid returns to the drilling rig,
    an uninterruptible vent line,
    a flow diverter means connected to said drilling conduit and to one end of said vent line for directing drilling fluid to said vent line in the event of a kick in the well,
    two uninterruptible deflect lines directed in different directions away from the drilling rig, and
    deflecting means connected to one end of each of said two deflect lines and to the other end of said vent line for directing fluid in said vent line to at least one of said two deflect lines while assuring against inadvertent simultaneous closure of said two deflect lines.

2. The system of claim 1 wherein the deflecting means comprises,
    first and second deflect lines,
    a housing having three external ports, one of the ports being connected to the vent line, a second one of the ports being connected to the first deflect line, and a third one of the ports being connected to the second deflect line, and
    a rotary sleeve in the housing having its bore coaxially aligned with the port connected to the vent line and adapted for rotation between a first position where a first sleeve outlet is aligned with the housing port connected to the first deflect line and a second position where a second sleeve outlet is aligned with the housing port connected to the second deflect line.

3. The system of claim 2 wherein the deflecting means further comprises,
    a removable target means disposed at the opposite end from the port connected to the vent line, the target means being constructed of an erosion resistant material.

4. The system of claim 2 further comprising actuating means for rotating the rotary sleeve between the first and second positions.

5. The system of claim 1 wherein the deflecting means comprises,
    a tubular "T" connecting element, where the outlets of the connecting element are connected respectively to said two deflect lines and the inlet of the connecting element is connected to the outlet of the vent line, and
    a deflecting element means disposed in the connecting element for directing flow from the inlet of the connecting element to at least one of the outlets of the connecting element.

6. The system of claim 5 wherein the deflecting element means comprises an element disposed between the outlets of the connecting element and adapted for angular rotation from a first position, where flow from the vent line via the inlet of the connecting element is directed by the element to a first connecting element outlet, to a second position, where flow from the vent line is directed by the element to a second connecting element outlet.

7. The system of claim 5 wherein the deflecting element means comprises an element disposed between the outlets of the connecting element and adapted for linear movement from a first position, where flow from the vent line via the inlet of the connecting element is directed by the element to a first connecting element outlet, to a second position, where flow from the vent line is directed by the element to a second connecting element outlet.

8. A diverting system for directing drilling fluid away from a drilling rig in the event of a kick while drilling a well, the system comprising,
    a drilling conduit through which the drilling fluid returns to the drilling rig,
    an uninterruptible vent line,
    a flow diverter means connected to said drilling conduit and to one end of said vent line for directing drilling fluid to said vent line in the event of a kick in the well, said flow diverter means having a means for controlling flow of fluid through said vent line,
    two uninterruptible deflect lines directed away from the drilling rig, and
    deflecting means connected to one end of each of said two deflect lines and to the other end of said vent line for directing fluid in said vent line to at least one of said two deflect lines while assuring against inadvertent simultaneous closure of said two deflect lines.

* * * * *